(12) United States Patent
Kozub et al.

(10) Patent No.: US 8,038,573 B2
(45) Date of Patent: Oct. 18, 2011

(54) POWER DEVELOPMENT FOR RAPID START IN FULL-HYBRID DRIVES WITH OPTIMIZED TRACTION CONTROL

(75) Inventors: Christoph Kozub, Furna (CH); Herman Jonsson, Huskvarna (SE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 777 days.

(21) Appl. No.: 12/104,940

(22) Filed: Apr. 17, 2008

(65) Prior Publication Data
US 2009/0264248 A1    Oct. 22, 2009

(51) Int. Cl.
*B60W 10/02* (2006.01)
*B60W 10/00* (2006.01)
*B60K 1/02* (2006.01)

(52) U.S. Cl. ............... 477/5; 477/3; 180/65.265

(58) Field of Classification Search .......... 477/3, 4, 477/5, 133, 136, 141; 180/65.265; 701/90
See application file for complete search history.

(56) References Cited

U.S. PATENT DOCUMENTS

| | | | |
|---|---|---|---|
| 5,993,350 A * | 11/1999 | Lawrie et al. | 477/5 |
| 6,262,491 B1 * | 7/2001 | Kitajima et al. | 290/40 C |
| 6,602,161 B2 * | 8/2003 | Hemmingsen et al. | 477/79 |
| 7,608,011 B2 * | 10/2009 | Grabowski et al. | 477/5 |
| 7,837,593 B2 * | 11/2010 | Silveri et al. | 477/5 |
| 2002/0142884 A1 | 10/2002 | Kitajima et al. | |
| 2003/0052650 A1 | 3/2003 | Gunji | |
| 2005/0181907 A1 * | 8/2005 | Colvin et al. | 477/3 |
| 2006/0130601 A1 * | 6/2006 | Hughes | 74/340 |

FOREIGN PATENT DOCUMENTS
EP    1 008 484 A2    6/2000

OTHER PUBLICATIONS
European Search Report dated Jul. 20, 2011 (seven (7) pages).

* cited by examiner

*Primary Examiner* — J. Allen Shriver, II
*Assistant Examiner* — James M Dolak
(74) *Attorney, Agent, or Firm* — Crowell & Moring LLP

(57) ABSTRACT

A launch control system for a hybrid vehicle is described. The system includes overcharging an electrical energy storage unit of the hybrid vehicle, operating an internal combustion engine at an increased power level, and operating an electric motor at an increased power level with the overcharged electrical energy storage unit. The transmission during the launch is configured to connect the electric motor and the internal combustion engine to a drivetrain of the hybrid vehicle, and to selectively slip friction clutches to store energy and release it for the launch.

19 Claims, 4 Drawing Sheets

POWER DEVELOPMENT FOR RAPID START IN FULL-HYBRID DRIVES WITH OPTIMIZED TRACTION CONTROL

BACKGROUND OF THE INVENTION

The present invention relates to methods and systems for providing launch control from a standstill for hybrid vehicles.

Conventional hybrid vehicles utilize a combination of one or more electric motors and an internal combustion engine to provide propulsion to the vehicle. Typically, a battery or batteries are provided to power the electric motors, and the internal combustion engine may be used to recharge the batteries through a generator or alternator.

In some situations it may be desirable to launch the vehicle using maximum performance acceleration from a standstill or from a very low speed. In conventional vehicles powered by an internal combustion engine, this is accomplished, in some cases using an automatic transmission, by fully depressing the brake and accelerator pedals, and then releasing the brake to launch the vehicle. This places the torque converter in a stall condition, in which maximum torque can be generated. When the brake pedal is released, the vehicle obtains a maximum acceleration.

SUMMARY OF THE INVENTION

In one exemplary embodiment, the present invention is directed to a launch control method for a hybrid vehicle, which delivers maximum power output when the driver desires it, for example during a race start or other situation requiring maximum performance acceleration. This launch control method includes, for example, the acts of overcharging an electrical energy storage unit of the hybrid vehicle, operating an internal combustion engine of the hybrid vehicle at an increased power level, and operating an electric motor at an increased power level with the overcharged electrical energy storage unit. The method also includes configuring a transmission to connect the electric motor and the internal combustion engine to a drivetrain of the hybrid vehicle during launch, and to selectively slip friction clutches of the transmission to store energy for the launch.

In another aspect, the invention is directed to a launch control system for a hybrid vehicle, having an internal combustion engine providing propulsion for the vehicle and driving elements for recharging an electrical energy storage unit, an electric motor for providing propulsion to the vehicle, and a transmission with controlled slip clutches for selectively connecting the internal combustion engine and the electric motor to a drivetrain of the vehicle. Also provided is a control unit which, upon receiving a launch signal, commands overcharging of the electrical energy storage units, a maximum power configuration of the internal combustion engine, a discharge of the overcharged electrical energy storage unit to obtain a maximum power of the electric motor, and controlled clutch slip. The internal combustion engine may be any known engine suitable for propulsion of a vehicle, and/or for generating electrical power used to recharge batteries or power electric motors.

The conventional methods of launching a vehicle from a standstill to a selected speed, using maximum acceleration, cannot generally be used in hybrid vehicles. The transmissions used in hybrid vehicles are different from those of conventional vehicles, such that the technique of accelerating the engine while holding the vehicle stationary, to place the torque converter in the stalled condition, is not applicable. Techniques used to launch vehicles equipped with manual transmissions are also not applicable, because they involve the driver releasing the clutch as the power of the engine is increased. Many hybrid vehicles use a modified automatic transmission to achieve better mileage, better performance and lower emissions as an integral part of the drive train. Manual transmissions are typically not used.

Some examples, or transmission used in hybrid vehicles may include both continuously variable gear ratios, used in certain modes and over certain operating ranges, and may also include fixed gear ratios, which are available in other operating ranges. Depending on the operating conditions of the vehicle, the type of driving and whether electric and/or internal combustion power is used, among other parameters, a computer controller selects an optimized operating mode of the transmission to provide the best possible combination of power, fuel economy, low emissions and comfort.

Transmissions for hybrid vehicles often incorporate, together with the gears and hydraulic power transmission components, the electric motors used to power the vehicle electrically. Although this feature may increase the complexity of the transmission, incorporating the electric motors allows the device to also function as a continuously variable transmission. In one exemplary embodiment, two electric motors, such as three phase induction motors, may be incorporated into the hybrid transmission. Alternatively, they may be incorporated in the hubs. The exemplary motors also operate as generators that recharge the batteries of the vehicle when slowing down the vehicle, or when rotated by the internal combustion engine. One or more selectively engaging friction clutches may be used to route the power flow from the electric motors or from the internal combustion engine to the drive train of the vehicle, to direct power to the wheels and to turn the motors/generators.

In the case of conventional full hybrid vehicles, it is generally not possible to obtain a rapid launch from a slow speed or a standstill by using only the electric driving function. This is in part because, at speeds below a certain threshold speed, the battery power supplied by the electrical components is below the power that can be supplied by the internal combustion engine. In general, therefore, the internal combustion engine is connected only after an electric start, and only then develops an increasing maximal transmission line supply power. This arrangement is not satisfactory, because it does not provide the high transmission output torque and high breakaway torque which is desirable when a rapid start, or launch, of a high performance vehicle is desired.

In the exemplary embodiments of the present invention, an intelligent control of the hybrid automatic transmission, together with control of the internal combustion engine and associated components is used to provide the desired high performance start, or launch of the vehicle. This arrangement permits the maximization of the power and torque being transmitted to the wheels when a maximum performance launch is desired by the driver.

Although the exemplary embodiments described below are directed principally to a hybrid transmission containing built-in electric motors and paired to an internal combustion engine, it will be understood by those skilled in the art that different arrangements and different sources of power may be used. For example, electric motors mounted in the hubs of the vehicle wheels may be mated to the transmission, as well as electric motors placed in other locations of the drivetrain. The internal combustion engine may be a gasoline engine, diesel engine, natural gas or hydrogen fueled engine or may include another source of motive power, such as, for example a turbine or other device. Additional components may also be included in the power generation apparatus, such as fuel cells, capacitors, etc.

In one exemplary embodiment of the invention, an intelligent launch control system is provided to control the power generation elements of the vehicle in order to provide the highest performance possible launch. For example, the intelligent launch control system may be implemented in a processor, such as an electronic processor, associated with memory elements containing the necessary instructions for the processor to carry out the intelligent control system instructions. Various sensors, as necessary, may also be connected to the processor and may provide information regarding the conditions of the electrical components, internal combustion engine, engine accessories, driver operable controls, etc. For Example, pressure sensors, temperature sensors, battery charge sensors, etc. may be used.

The exemplary intelligent control system utilizes a combination of techniques to prepare and carry out the maximum performance launch of the hybrid vehicle. As an initial step, the batteries of the vehicle are overcharged beyond their normal full charge to provide additional power deliverable to the electric motors during the launch. In one exemplary embodiment, a battery pack may be disposed within the vehicle to provide power for the electric drive motors and all other electrically powered devices on the vehicle. The electric motors can be motor/generators, which are typically used to recharge the batteries.

According to an embodiment of the invention, the internal combustion engine is placed in a raised power level in preparation of the vehicle's launch. This facilitates the charging and overcharging of the batteries by the motor/generators driven by the IC engine. In one exemplary embodiment, the batteries may become overcharged from a typical operational charge level in a short period of time, providing a fast charge suitable for the upcoming high performance launch. The overcharge condition of the batteries permits the electric motors of the hybrid vehicle to be operated at a raised power level during the launch sequence.

Those of skill in the art will understand that batteries are only one type of energy storage devices which may be used according to the invention. In other embodiments, fuel cells, capacitors, kinetic or chemical energy storage devices and other devices adapted to store energy may be used instead of the rechargeable batteries to capture and release energy when needed.

The internal combustion engine of the hybrid system is also set up to generate the maximum available power in anticipation of the launch, in a raised power level. For example, the maximum speed (RPM) of the engine may be increased, to generate a higher level of power during the launch. In the case of a turbocharged engine, the maximum allowable intake air pressure may be increased, also to provide a higher power level during the launch. For example, in the raised power level of the engine, the turbocharger or supercharger compressor pressure ratio and/or RPM limits may be increased. According to the invention, the intelligent launch control system adjusts the necessary settings and parameters of the internal combustion engine to generate a higher than normal level of power while in the raised power level mode of operation.

Another component of the intelligent control system for launching the hybrid vehicle includes utilizing controlled clutch slip, or clutch tugging, of the friction clutches disposed within the hybrid transmission. This method involves allowing some limited slipping due to limitations in power allowed to be transferred to the clutch, to avoid overheating of the clutch surfaces which may cause burning or welding of the clutch. A result is rotation of the clutches, so that additional energy is stored therein, which can be released to the drive wheels during the launch. The control unit already commands operation of the clutches in the normal mode, for example to obtain a desired power flow between the IC engine and/or electric motors and the drive train, and to charge the batteries using the motors/generators.

In one exemplary embodiment according to the invention, a triggering mechanism may be provided for the driver to initiate the steps necessary for the launch sequence. For example, a dedicated switch or trigger on the gearshift handle may be provided, or a sequence of operation of the gearshift paddles may be used to send a launch signal to the intelligent launch control system to prepare for the maximum performance launch. Alternatively, the more conventional technique of holding both the brake and the accelerator pedals fully depressed may be interpreted by the system as the trigger to initiate the launch control sequence.

Solutions have been developed to instruct conventional launch control systems that a high performance launch is desired, and may be modified to work with embodiments of the hybrid launch control according to the invention. For example, systems developed by BMW's M-GmbH division to trigger a race launch of the sequential transmission involve pressing the brake, holding the gear selector in TIP-DOWN position, and stepping fully on the accelerator. Releasing the gear lever then launches the vehicle. In another example, a triggering system developed by BMW AG includes holding the vehicle by using the gear triggering paddles mounted on the steering wheel, while in TIP-DOWN mode, and then releasing the vehicle with the paddles. Those of skill in the art will understand that the vehicle's intelligent launch control system may be prompted in many ways to prepare the vehicle and to carry out the launch control.

According to the invention, the batteries of the vehicle are maintained in the overcharged condition for a short period of time, typically only a few minutes, before being discharged to a safe level during the launch. Damage to the batteries and the electrical system because of overcharging is thus not likely. However, other components of the vehicle may be stressed by the launch sequence. For example, the internal combustion engine may be stressed beyond the normal operation levels because of the increased RPM and turbo pressure limits. The internal clutches of the transmission also may be subject to abnormal stresses during the launch sequence, due to the controlled slip used to store additional energy.

It may be necessary, to protect the durability of the engine/drivetrain, to limit the number of maximum performance launch control events performed by the vehicle. A counter or other method of keeping track of the number of launches and/or the interval from previous launches may be employed. In some cases, the ability to disable the launch control function may be provided, for example when a maximum performance launch may cause failure of some components.

In an exemplary embodiment according to the invention, the electronic traction control and/or electronic stability control (ESP) of the vehicle may also be used by the launch control system. For example, parameters of the traction control system may be optimized to obtain the best acceleration from the enhanced power output of the drivetrain.

In another exemplary embodiment of the invention, a display may be used to keep the driver informed of the status of the hybrid system, and in particular of the actions taking place due to the intelligent launch control system during the high performance launch. For example, various schematics may be shown, indicating the status of the batteries, transmission, electric motors and internal combustion engine. In addition, any limitations due to the additional stresses on the power train due to launching may be shown.

Other objects, advantages and novel features of the present invention will become apparent from the following detailed description of the invention when considered in conjunction with the accompanying drawings.

DETAILED DESCRIPTION OF THE DRAWINGS

A clear, unambiguous and intuitively understandable system to provide a launch control of a hybrid vehicle is provided to the driver according to the invention. In this system, the maximum output from both the internal combustion engine and the electric motors is combined, and is used together with manipulation of the transmission's clutches to generate a maximum acceleration from a standstill.

Figure 1:
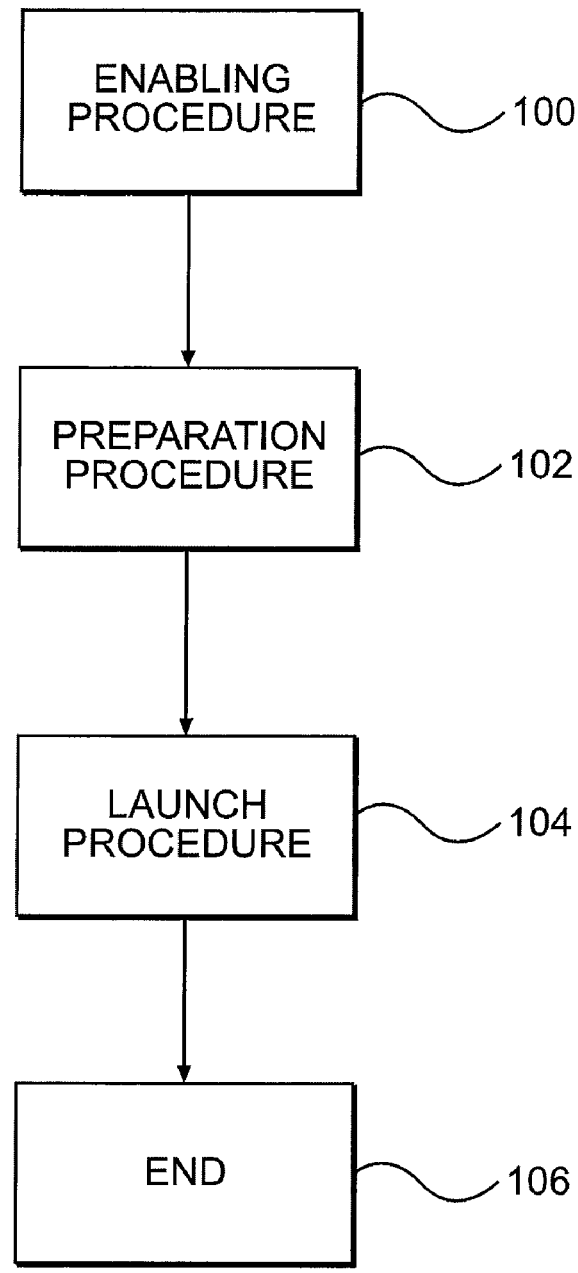
FIG. 1 is a flow diagram showing the overall steps for a launch control system for hybrid vehicles according to an exemplary embodiment of the present invention.

As shown in FIG. 1, an exemplary launch control system according to an embodiment of the invention includes separate procedures to carry out various functions. An enabling procedure 100 begins the sequence, followed by a preparation procedure 102 and then by the actual launch procedure 104, described in greater detail below.

Figure 2:
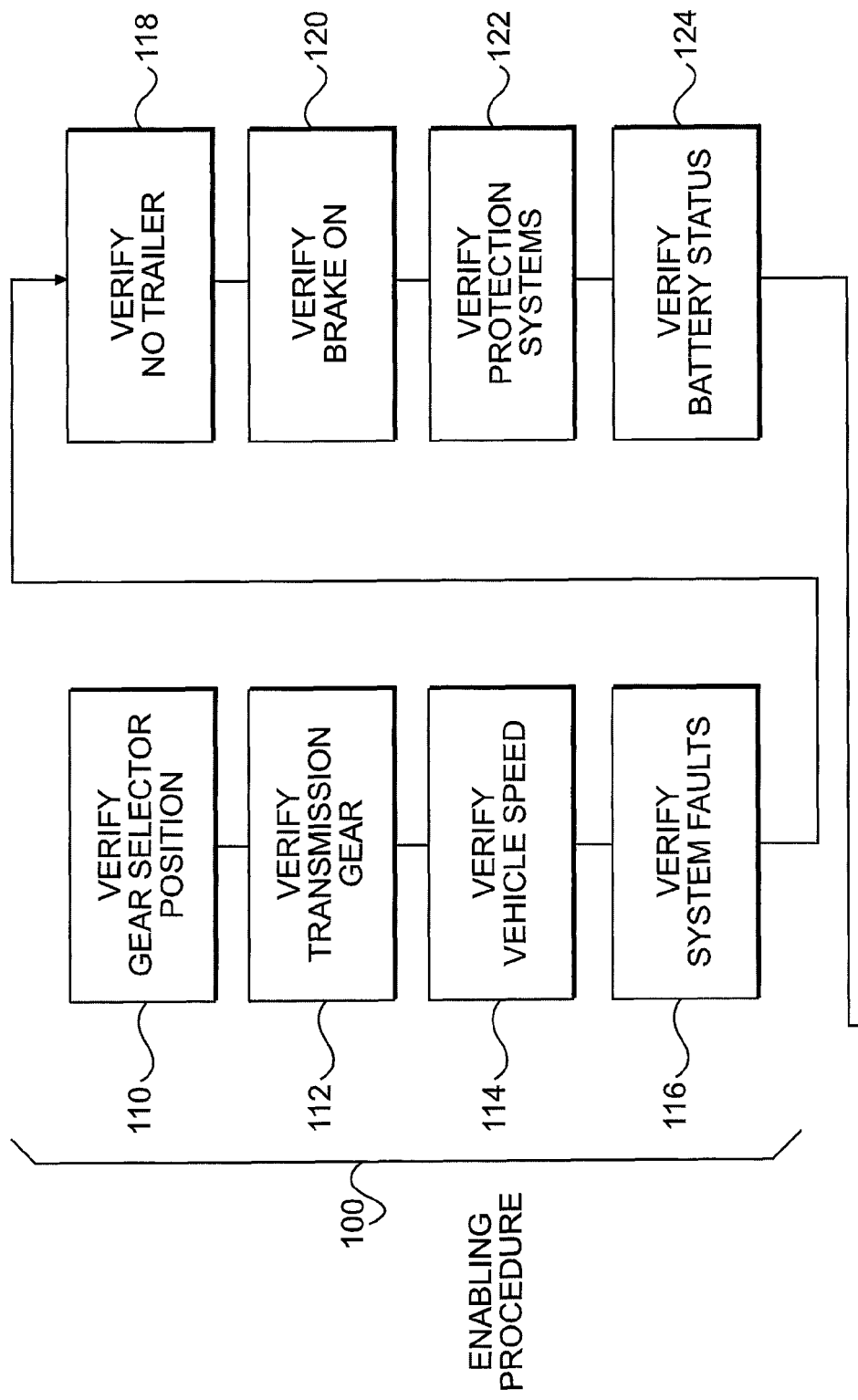
FIG. 2 is a detailed flow diagram showing the steps of an exemplary enabling procedure of the launch control according to the present invention.

Several preliminary steps are performed in an enabling procedure 100, shown in FIG. 2. These steps ensure that the vehicle is in the proper configuration for the launch control to take place. For example, an initial step 110 may verify the position of the gear selector out of D (drive), and into another mode such as M (manual) or S. The actual gear position of the transmission is also verified in step 112, for example to ensure that it is in first gear.

The speed of the vehicle is verified in step 114, to ensure it is stationary or very slow (i.e. less than 4 km/hr) and any faults in the system are verified in step 116. Step 118 verifies that no trailer is being towed, and step 120 verifies that the brake is being applied. Protection systems of the vehicle are checked in step 122, for example to verify that the vehicle has been broken in (i.e. the mileage is over 2000 km) and that an excessive number of high performance race starts has not already taken place. The condition of the battery is verified in step 124, to ensure its charge, temperature etc. are within limits.

Figure 3:
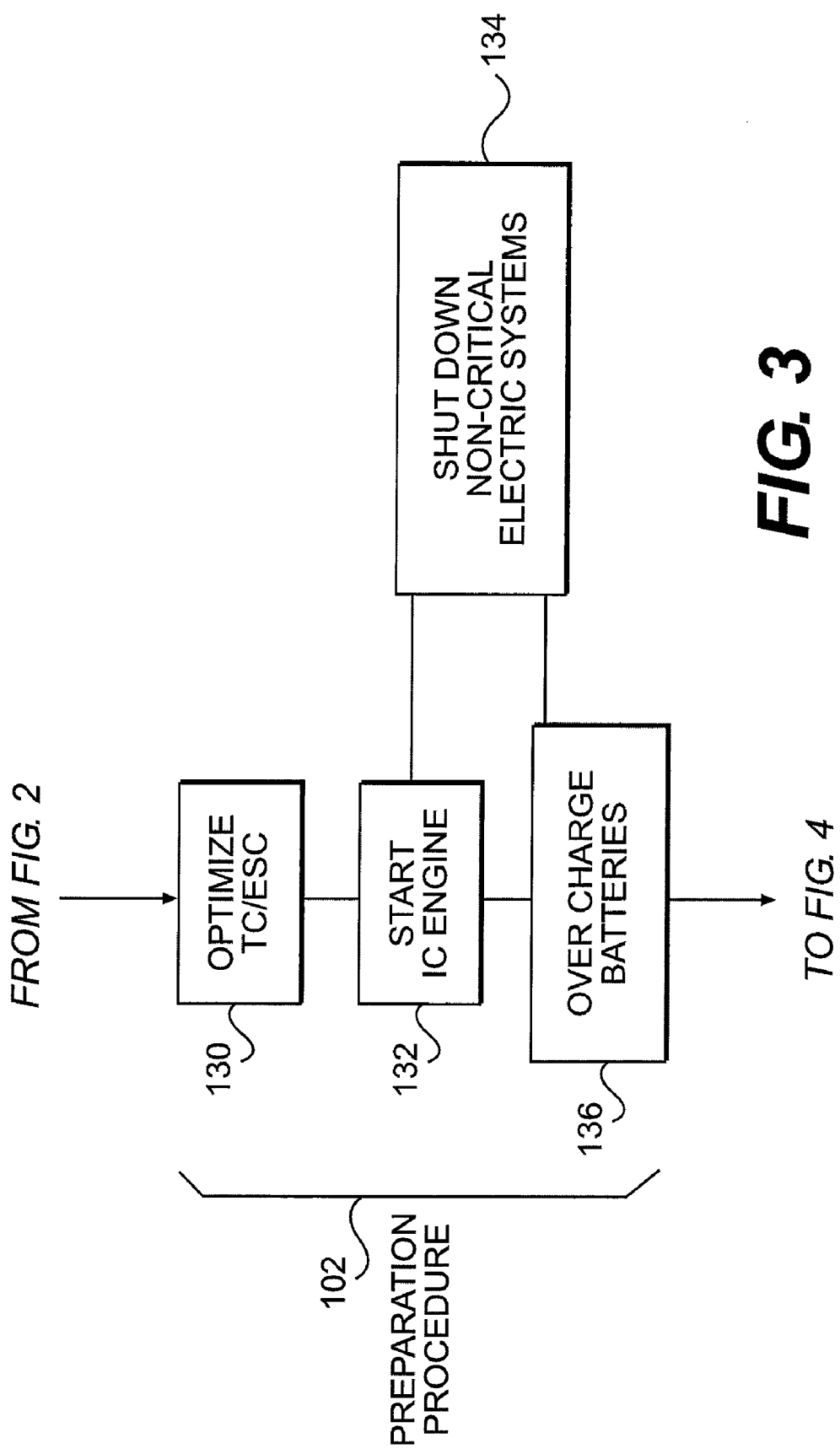
FIG. 3 is a detailed flow diagram showing the steps of an exemplary preparation procedure of the launch control according to the present invention.

If all the enabling steps are positive, the intelligent launch control system then prepares the vehicle for launch in procedure 102, shown in FIG. 3. In step 130, the traction control and/or the enhanced stability control are optimized for the launch, and the IC engine is started in step 132, if not already operating. Non critical electrical systems are shut down or reduced, to provide maximum charging power to the batteries in step 134, and the IC engine is operated at an increased power level to overcharge the battery in step 136.

Figure 4:
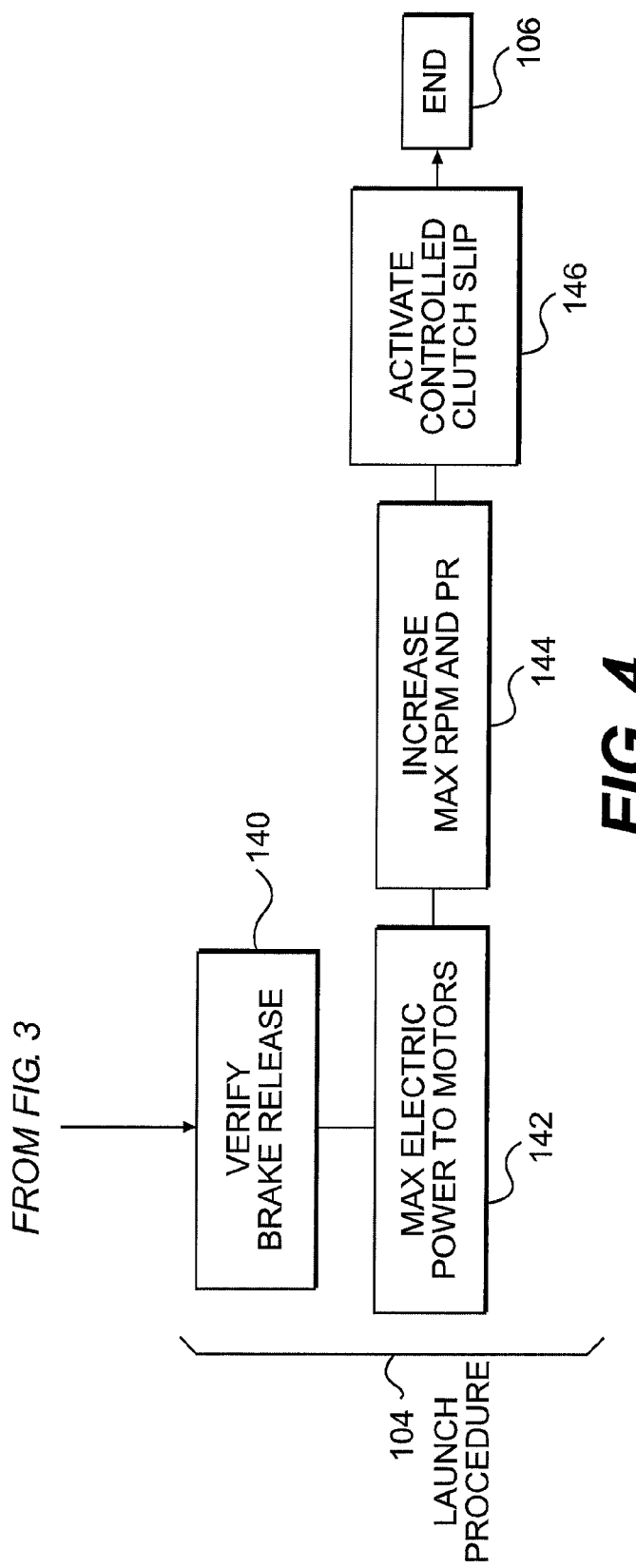
FIG. 4 is a detailed flow diagram showing the steps of an exemplary launch procedure of the launch control according to the present invention.

Once steps in the preparation procedure 102 are completed, the system executes the exemplary launch control in sequence 104, shown in FIG. 4. After verifying that the brake has been released in step 140, maximum power to the electric motors is provided from the overcharged batteries in step 142, and the IC engine is operated at the higher maximum RPM and turbo pressures in step 144. Controlled clutch slip is allowed in step 146 to further maximize the power and torque reaching the drive wheels of the hybrid vehicle.

According to an exemplary embodiment of the invention, the launch control functions are maintained until certain defined events take place. For example, the launch control function may be terminated in step 106 if the speed of the vehicle increases over a set speed, such as 105 km/hr, or when the accelerator pedal position changes from full power, such as below 90% deflection. In addition, the launch may be discontinued if certain mechanical parameters fall outside of guidelines, for example if a low battery voltage is detected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A launch control system for a hybrid vehicle, comprising:
    an internal combustion engine providing propulsion for the vehicle and driving elements for recharging an electrical energy storage unit;
    an electric motor for providing propulsion to the vehicle;
    a transmission comprising controlled slip clutches for selectively connecting the internal combustion engine and the electric motor to a drivetrain of the vehicle; and
    a control unit which, upon receiving a launch signal, commands overcharging of the electrical energy storage units, a raised power configuration of the internal combustion engine, a discharge of the overcharged electrical energy storage unit to obtain a raised power of the electric motor, and controlled clutch slip.

2. The system according to claim 1, wherein the electrical energy storage unit comprises at least one of rechargeable batteries and dual capacitors.

3. The system according to claim 1, wherein the control unit commands overcharging of the electrical energy storage units by configuring the transmission to drive the electric motor, as a generator, with the internal combustion engine operating at a higher power level.

4. The system according to claim 1, wherein the electric motor is a motor/generator for recharging the electrical energy storage unit.

5. The system according to claim 1, further comprising at least one of a traction control system and a stability control system optimizable by the control unit for launch control.

6. The system according to claim 1, further comprising a user operated trigger to generate the launch signal.

7. The system according to claim 1, wherein the control unit sets increased limits for internal combustion engine rotational speed and pressure after receipt of the launch signal.

8. The system according to claim 1, further comprising a display system for depicting status information of at least one of the launch control system, internal combustion engine, electric motor and transmission.

9. A launch control method for a hybrid vehicle, comprising the acts of:
    overcharging an electrical energy storage unit of the hybrid vehicle;

operating an internal combustion engine of the hybrid vehicle at a raised power level during the launch;

operating an electric motor at a raised power level during the launch, with power from the overcharged electrical energy storage unit; and configuring a transmission to connect during the launch the electric motor and the internal combustion engine to a drivetrain of the hybrid vehicle, and to selectively slip friction clutches of the transmission to store energy releasable during the launch.

10. The method according to claim 9, further comprising receiving in a control unit of the vehicle a user generated launch signal, the control unit commanding configuring of the internal combustion engine, the electric motor and the transmission.

11. The method according to claim 9, further comprising optimizing at least one of a traction control and stability control system for the launch.

12. The method according to claim 9, further comprising discontinuing the launch control method when one of a selected speed, selected accelerator pedal position and selected range of hybrid system parameters is reached.

13. The method according to claim 9, further comprising operating the internal combustion engine at a raised power level to overcharge the electrical energy storage unit.

14. The method according to claim 9, further comprising configuring the transmission to drive an electric motor/generator with the internal combustion engine to overcharge the electrical energy storage unit.

15. The method according to claim 9, further comprising monitoring a frequency of use of the launch control system and time intervals between instances of use thereof.

16. The method according to claim 15, further comprising inhibiting the launch control method in response to the monitored frequency and interval.

17. The method according to claim 9, further comprising verifying that the transmission is in a first gear prior to the launch control.

18. The method according to claim 9, further comprising verifying that a charge condition and a temperature of the battery are substantially within an allowable range before permitting the launch.

19. The method according to claim 9, further comprising displaying to a user a depiction of a condition of at least one of the electric motor, internal combustion engine, electric energy storage system and transmission.

* * * * *